United States Patent
Lim et al.

(10) Patent No.: US 8,268,045 B2
(45) Date of Patent: Sep. 18, 2012

(54) COMPRESSED AIR PRODUCING METHOD AND PRODUCING PLANT

(75) Inventors: Yong Yi Lim, Singapore (SG); Tsuyoshi Matsutomi, Akshi (JP); Shoji Kaneshima, Kobe (JP); Shinji Tomita, Hyogo (JP)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 601 days.

(21) Appl. No.: 12/278,198

(22) PCT Filed: Jan. 15, 2007

(86) PCT No.: PCT/IB2007/000101
§ 371 (c)(1), (2), (4) Date: Jul. 20, 2009

(87) PCT Pub. No.: WO2007/091135
PCT Pub. Date: Aug. 16, 2007

(65) Prior Publication Data
US 2009/0272264 A1    Nov. 5, 2009

(30) Foreign Application Priority Data

Feb. 6, 2006  (JP) ................................. 2006-028578

(51) Int. Cl.
*B01D 53/047* (2006.01)
*B01D 53/26* (2006.01)

(52) U.S. Cl. ............................................. 95/97; 95/104

(58) Field of Classification Search ................ 95/14, 19, 95/96–98, 104, 105; 96/112–114, 121, 130
See application file for complete search history.

(56) References Cited

U.S. PATENT DOCUMENTS

| | | | |
|---|---|---|---|
| 4,077,779 A * | 3/1978 | Sircar et al. ....................... 95/26 |
| 4,957,523 A | 9/1990 | Zarate et al. | |
| 5,202,096 A | 4/1993 | Jain | |
| 6,077,488 A | 6/2000 | Jain et al. | |
| 6,083,299 A * | 7/2000 | Kapoor et al. .................. 95/100 |

(Continued)

FOREIGN PATENT DOCUMENTS
EP  1 060 774   12/2000
(Continued)

OTHER PUBLICATIONS

Patent Abstracts of Japan, publication No. 2003-326127, publication date Nov. 18, 2003; application No. 2002-134484, filed May 9, 2002.

(Continued)

*Primary Examiner* — Frank Lawrence, Jr.
(74) *Attorney, Agent, or Firm* — Patricia E. McQueeney

(57) ABSTRACT

A compressed air producing method, in which two or more adsorption columns, in all or part of which a zeolite-series adsorbent is charged, are switched over to purify feed air and the adsorbent charged in at least one adsorption column of said adsorption columns is regenerated in turn with regeneration gas, is characterized by comprising a step of performing, when an adsorption column (R) in a regeneration step transfers to a purification step, the purge of said adsorbent with purified air, and characterized in that the internal pressure of an adsorption column (R) in the purge step is controlled such that a differential pressure thereof from the internal pressure of an adsorption column (P) in the purification step falls within a specified value.

3 Claims, 6 Drawing Sheets

U.S. PATENT DOCUMENTS

| | | | | |
|---|---|---|---|---|
| 6,113,672 A | * | 9/2000 | Kapoor et al. | ............... 95/101 |
| 6,471,749 B1 | | 10/2002 | Kawai et al. | |
| 2003/0037672 A1 | | 2/2003 | Sircar | |
| 2007/0193446 A1 | | 8/2007 | Nakamura et al. | |

FOREIGN PATENT DOCUMENTS

| | | |
|---|---|---|
| JP | 2003 175311 | 6/2003 |
| JP | 2005 279611 | 10/2005 |

OTHER PUBLICATIONS

Patent Abstracts of Japan, publication No. 2002-346330, publication date Dec. 3, 2002; application No. 2001-154541, filed May 23, 2001.

Patent Abstracts of Japan, publication No. 2000-024445, publication date Jan. 25, 2000; application No. 10-192095, filed Jul. 7, 1998.

International Search Report for PCT/IB2007/000101.

* cited by examiner

COMPRESSED AIR PRODUCING METHOD AND PRODUCING PLANT

This application is a 371 of International PCT Application PCT/IB2007/000101, filed Jan. 15, 2007.

TECHNICAL FIELD

The present invention is related to a compressed air producing method and producing plant. Especially, the present invention is useful for a compressed air producing method and producing plant utilized for supplying compressed dry air (CDA) that is frequently use in semiconductor manufacturing factories or liquid crystal manufacturing factories. In addition, "CDA" used here represents a wide idea inclusive of air, from which methane or carbon dioxide and besides moisture or various kinds of hydrocarbons have been removed or treated.

BACKGROUND

In semiconductor manufacturing factories or liquid crystal manufacturing factories, pure nitrogen obtained by vaporizing liquefied nitrogen has been hitherto utilized in a large amount for cleaning or purging use in respective steps. In recent years, however, the use of cheap CODA is increasing in place of pure nitrogen.

In a plant for producing CDA, in answer to such demand, there have been usually adopted adsorption units of the TSA (Temperature Swing Adsorption) system (Heating regeneration unit) and PSA (Pressure Swing Adsorption) system (Pressure reduction regeneration unit), which are of the two-column switching system using molecular sieve or silica gel. By improving the efficiency and operability or attempting improvements in cost, furthermore, there has been proposed various compressed air producing methods and producing plants.

As shown in FIG. 6, for example, there is disclosed a method and plant for supplying highly pure CDA and dry air that has been hitherto used at the same time, with good efficiency and in stability. Namely, a compression step of compressing feed air by an air compressor 101, a prepurification step of removing moisture in the feed air by a prepurifier 103, a catalytic purification step of converting hydrogen and carbon monoxide in the feed air to moisture and carbon dioxide by a catalytic purifier 105 and an adsorptive purification step of removing moisture and carbon dioxide by an adsorptive purifier 106 are performed in this order, whereby highly pure dry air can be obtained and dry air that has passed through said prepurification step can be collected as a product at any time (see: for example Patent Document 1).

As shown in FIG. 7, furthermore, there is disclosed a method and plant for producing CDA free from impurities that are unsuitable for semiconductor manufacture such as methane, carbon monoxide, hydrogen, carbon dioxide gas and moisture. Namely, feed air AR is compressed by a compressor 201, compressed air ARp warmed by the corresponding compression heat is further heated by a heater 203 to make compressed heated air ARph, methane, carbon monoxide and hydrogen contained in the feed air are reacted with oxygen in air in a catalyst column 204 to make moisture and carbon dioxide gas, the compressed air ARr left after the reaction is then cooled down to normal temperatures or a temperature less than such temperatures by a cooling facility 205, and the compressed air is thereafter brought into contact with an adsorbent M of an adsorptive purification facility 206 to remove through adsorption impurities such as the converted moisture and carbon dioxide gas contained therein. Thus, clean dry air Ao, in which methane, carbon monoxide, hydrogen, carbon dioxide gas and moisture contained in air have been removed to less than 1 ppm, can be obtained (see: for example Patent Document 2).

As shown in FIG. 8, it is disclosed that exhaust gas discharged from an air separation unit 301 is utilized as regeneration gas for an adsorbent of a CDA producing plant. By utilizing as regeneration gas in a CDA producing plant of the two-column switching system using convention PSA units, exhaust gas of an air separation unit can be effectively used, not influenced by the composition thereof and the use amount of self-produced gas that is used as regeneration gas for the CDA producing plant can be reduced or dispensed. Furthermore, there can be provided a CDA producing method that is cheap and easy in management (see: for example patent Document 3).

(Patent Document 1) Official gazette of Japanese Patent Application Laid-open No. 24,445/2000;
(Patent Document 2) Official gazette of Japanese patent Application Laid-open No. 346,330/2002;
(Patent Document 3) Official gazette of Japanese Patent Application Laid-open No. 326,127/2003.

DISCLOSURE OF THE INVENTION

Problems Sought for Solution by the Invention

In the aforementioned CDA producing method and producing plant, however, part of purified gas is used to perform the regeneration of an adsorbent. If a long period of time is therefore taken as the regeneration time, the amount of CDA as a product will be reduced. If the regeneration time is not sufficiently secured, on the other hand, the dropping of the purifying capacity will be caused and the deterioration of the productivity or producing efficiency in CDA production will be caused.

Molecular sieve, whose adsorbing capacity and regenerating capacity are higher and which is suitable for the CDA purification, has a feature of selectively adsorbing the nitrogen component in air composition. In a course of subjecting an adsorption column, whose regeneration step has been finished, to pressure rise again, accordingly, the nitrogen fraction in pressure rise gas gets adsorbed in the adsorbent and as a result, gas enriched in oxygen remains in a system inclusive of the adsorption column just before it is switched to the purification step. Just after the adsorption column has been switched to the purification step, sometimes, the oxygen concentration in CDA temporarily rises 30-50% quickly. In compressed air producing methods and producing plants of the prior arts, such a phenomenon has not been mentioned in any cases. CODA that is high in oxygen concentration gives any influence on the yield of semiconductor manufacturing step such as stepper, and hence there has been demanded a plant which can supply CDA stable in oxygen concentration.

The amount of nitrogen adsorbed on an adsorbent will increase with the pressure rise in the system. In a substituting operation of making the internal pressure up and down as in the conventional PSA system, therefore, the influence of the adsorption of nitrogen fraction could not be completely eliminated and the oxygen concentration just after the switching rose several percent.

It is an object of the present invention to provide a compressed air producing method and producing plant, whose efficiency is high owing to simple functions and which can supply CDA stable in oxygen concentration. In particular, it is aimed at providing a compressed air producing method and producing plant, which are higher in usefulness and reliability for supply of CDA that is frequently used in semiconductor manufacturing factories or liquid crystal manufacturing factories.

Means for Solution of the Problems

In order to solve the aforementioned problems, the inventors have studied hard. The inventors have found, as a result, that the aforementioned object can be achieved by a compressed air producing method and producing plant mentioned below and have completed the present invention.

According to the present invention, a compressed air producing method, in which two or more adsorption columns, in all or part of which a zeolite-series adsorbent is charged, are switched to purify feed air and the adsorbent charged in at least one adsorption column of said adsorption columns is regenerated in turn with regeneration gas, is characterized by comprising a step of performing, when an adsorption column (R) in a regeneration step transfers to a purification step, the purge of said adsorbent with purified air, and characterized in that the internal pressures of an adsorption column (R) in the regeneration step and together in the purge step is controlled such that a differential pressure thereof from the internal pressure of an adsorption column (P) in the purification step falls within a specified value.

In a compressed air producing method, it is preferred to use a zeolite-series adsorbent because of its higher purifying capacity. On the other hand, it is very difficult, particularly in PSA system, to prevent a transient phenomenon accompanied with the transfer of an adsorption column from the regeneration step to the purification step, caused by differences in the adsorbing features of adsorbed substances. According to the present invention, it is enabled to present such transient phenomenon by separately inserting a purge step midway in the transfer of an adsorption column from the regeneration step to the purification step, separately providing purified air that is equal to the purified air to be obtained in a next purification step in the same adsorption column, and performing the purge of the adsorbent charged therein.

Restraint conditions such as the composition of regeneration gas can be eliminated and can be optionally selected by making the composition of purge gas in the purge step equal to that of purified air. In a combination of a producing plant, using this compressed air producing method and an air separation unit (ASU), for instance, it is enabled to secure higher material or energy efficiency in the total plant by using as the regeneration gas a dry, nitrogen-rich or oxygen-rich byproduct that has been made redundant in ASU.

The temperature conditions or pressure conditions of adsorbent in the regeneration step and purification step vary widely even in a compressed air producing method based on any one of the TSA system or PSA system. Therefore, it is difficult to directly avoid a transient phenomenon at the switching time even when the compositions of gases in contact with the adsorbent are the same. By causing the same air to flow through the adsorption column (R) in the purge step and the adsorption column (P) in the purification step under an almost equal pressure condition (where a differential pressure between both the columns falls within a specified value), in the present invention, a difference in the pressure condition that mainly causes a transient phenomenon in the adsorption column (R) can be eliminated and as a result, CDA stable in oxygen concentration can be supplied with efficiency. By using such method actually, it is possible to restrain the rise of the oxygen concentration after the switching below 0.5% and it is enabled to provide a compressed air producing method which can supply CODA stable in oxygen concentration. "Specified value" used here is a control value that is determined using a set pressure for the inside of an adsorption column in the purification step as a reference. In a case where the internal pressure of an adsorption column in the purge step is controlled within a specified value of 5% to the set pressure as mentioned below, for instance, a specified value is represented by a ratio to a reference value. In a case where the set pressure is set at 1 MPa and the internal pressure is controlled at ±0.05 MPa, for instance, a specified value can be represented by a numerical value representing a range.

According to the present invention, the aforementioned compressed air producing method is characterized in that said adsorption columns are continuously switched in turn at least to (1) a purification step for feed air under a high pressure & low temperature condition; (2) a regeneration warming step using regeneration gas under a low pressure & high temperature condition; (3) a regeneration cooling step using regeneration gas under a low pressure & low temperature condition; and (4) a purge step using purge gas under a high pressure & low temperature condition as one cycle, and said adsorption columns are controlled such that when one of pairing or grouping adsorption columns among said adsorption columns is in the regeneration step or purge step, at least another one column is in the purification step.

In a compressed air producing method, there has been strongly required the prevention of such a transient phenomenon as mentioned above and the continuous supply of CDA has been strongly required. By composing pairing adsorption columns and by making, when one column is in the regeneration step or purge step, the other column to be in the purification step, in the present invention, the prevention of a transient phenomenon can be attempted and the continuous supply of CDA can be secured. Since one adsorption column P1, which has been purged by purified air, is then switched to a purification step, at the same time, the compatibility with the features of purified air from a pairing adsorption column P2 in the purification step and the same purifying function can be secured and the purified air currents fed out of both the adsorption columns can have the same composition. In a case where three or more adsorption columns form a group, the same functions can be secured by controlling these adsorption columns such that when one column thereof is in the regeneration step or purge step, at least another one column is in the purification step. Accordingly, it is enabled to provide a compressed air producing method, whose efficiency is high owing to simple functions and which can supply CODA stable in oxygen concentration.

The term "high pressure" used here means usually a pressure state within a range of 0.5~2 MPaG and "low pressure" means usually a pressure state within a range of −0.1~0.1 MPaG, inclusive of a case where a pressure reduced state is made. In addition, the term "high temperature" means usually a temperature state within a range of 60~300° C. and "low temperature" means usually a temperature state within a range of 5~60° C.

According to the present invention, the aforementioned compressed air producing method is characterized in that part of purified air fed out of at least one adsorption column (P) in said purification step is used as purge gas.

By providing a purge step after the completion of a regeneration step and causing the same air to flow under such a pressure condition that a differential pressure between an adsorption column (P) in the purification step and an adsorption column (R) in the purge step falls within a specified value, as mentioned above, in the present invention, differences in various conditions that cause a transient phenomenon in the adsorption column (R) can be eliminated and as result, CDA stable in oxygen concentration can be supplied with efficiency. By using part of purified air from the pairing adsorption column (P) as purge gas in the purge step, at that time, CDA stable in oxygen concentration can be efficiently supplied, without providing separate purge gas. As to the reduction of the production of purified air as a product caused by using its part as purge gas, it will be surely acceptable, judging from the importance of maintaining the quality of product, because the major of the regenerating function of an adsorbent can be performed in a regeneration step and the amount of gas required for the purge is consequently smaller. It can be said that this amount of gas required for the purge is very small, as compared with a conventional case where purified air has been used as regeneration gas.

According to the present invention, the aforementioned compressed air producing method if characterized by comprising a step of subjecting when the adsorption column in said purge step transfers to the purification step, feed are to adsorptive treatment in parallel to at least another one adsorption column (P) in the purification step.

In a compressed air producing method, it is required to continuously supply CDA stable in oxygen concentration. By parallel operating the adsorption column just before it transfers to the purification step and the adsorption column in the purification step under the same condition, in addition to the aforementioned method, according to the present invention, it is enabled to eliminate any influence of the transient phenomenon at a time when the adsorption column transfers from the purge step to the purification step and to secure the continuity of stable CDA supply.

According to the present invention, a compressed air producing plant is characterized by comprising two or more adsorption columns, in all or part of which a zeolite-series adsorbent is charged, a passage for introducing feed air into each of the adsorption columns, a passage for feeding out air left after purification from each of the adsorption columns, a passage for introducing regeneration gas into each of the adsorption columns, a passage for introducing purge gas into each of the adsorption columns, passages for discharging gas left after the regenerating treatment or purge from each of the adsorption columns, a control valve provided in each of said passages, and a controller for controlling the operation of said control valves and the internal pressure of each of the adsorption columns.

In a compressed air producing plant, it is important, in a transferring course from the regeneration step to the purification step, to prevent a transient phenomenon caused by differences in pressure or the likes between both the steps, and it is demanded to obtain a plant, whose efficiency is high owing to simple functions and which can supply CDA stable in oxygen concentration, is demanded. By making a plant having such a construction that a purge step can be inserted in addition to the purification step and regeneration step and a differential pressure from the internal pressure of an adsorption column (P) in the purification step can be controlled, in the purge step, so as to fall within a specified value, in the present invention, CDA stable in oxygen concentration can be continuously supplied. Furthermore, it is enabled to make smaller the use amount of purified air for regeneration of the adsorbent.

Effects of the Invention

By applying the compressed air producing method and producing plant according to the present invention, as mentioned above, it is possible to realize a compressed air producing method and producing plant, whose efficiency is high owing to simple functions and which can supply CDA stable in oxygen concentration.

MOST PREFERRED EMBODIMENTS FOR PUTTING THE INVENTION INTO PRACTICE

Now referring to the accompanying drawings, embodiments of the present invention will be described below. There will be mainly described here a construction example essentially composed of two adsorption columns P1 & P2, in which three steps that will be hereinafter mentioned are repeated in turn. If at least one adsorption column (P) in a purification step exists always, however, the number of adsorption columns is not limited thereto. If at least one adsorption column (R) in a regeneration step or purge step makes a pair with at least one of the adsorption columns (P), the present invention can be also applied to a case where two or more adsorption columns (P) make a pair in turn with one adsorption column (R), not limited to a case where specified adsorption columns make a pair with each other.

Basic Construction Example of Compressed Air Producing Plant according to the Present Invention In FIG. 1 is given one construction example of the compressed air producing plant according to the present invention. Concretely, the compressed air producing plant comprises two or more adsorption columns P1, P2, in all or part of which a zeolite-series adsorbent is charged; a passage La for introducing feed air into the adsorption columns P1, P2, a passage Lb for feeding out air left after purification from the adsorption columns P1, P2, a passage Lc for introducing regeneration gas into the adsorption columns P1, P2; a passage Ld for introducing purge gas into the adsorption columns P1, P2; passages Le1, Le2 and Lf1, Lf2 for discharging gas left after the regenerating treatment or purge from the adsorption columns P1, P2; control valves Va1, Va2~Vf1, Vf2 provided in said passages La~Lf; and a controller (not shown) for controlling the operation of said control valves Va1, Va2~Vf1, Vf2 and the internal pressure and internal temperature of the adsorption columns P1, P2.

Feed air is introduced into the adsorption column P1 or P2 through the passage La, and it is subjected to the removal or treatment of moisture, carbon dioxide, methane or various kinds of hydrocarbons by a zeolite-series adsorbent charged therein (a purification step) and then fed out as product CDA through the passage Lb. The CDA that has been fed out will be used as clean air for the semiconductor manufacturing process or liquid crystal manufacturing process. As the supply condition of feed air, environmental temperature is usually used and feed air will be supplied at a flow rate of about 1,000~10,000 [$Nm^3/h$]. In addition, the pressure condition varies depending on the use of purified air, but in the PSA system, feed air is used, for improving the adsorbing efficiency, as it is pressurized to as high as 0.5~2 [MPaG] by a compressor (not shown) or the like.

At that time, it is preferred that an adsorbent used in the purification step removes not only moisture, but also carbon dioxide and hydrocarbons, and hence a zeolite-series adsorbent or concretely one consisting mainly of molecular sieves 3 A and 5 A is preferably used. Silica gel or alumina gel can be exemplified as an adsorbent to be mixed. The kinds of these adsorbents and their mixing ratio will be preferably set in accordance with the property of feed air. Use condition of adsorbents is set on the basis of conditions such as "high temperature" and "low temperature" as an internal temperature that has been previously given or "high pressure" and "low pressure" as an internal pressure. These conditions are controlled by use of the output powers of thermometers and pressure gauges (not shown) as barometers. Depending on the amount, pressure and temperature of purified air to be demanded and the kinds and concentration of impurities, the size (content volume) of adsorption columns and the amount of adsorbent will be set.

After a predetermined use time (for example, several times several days) of an adsorbent has passed, the adsorption column transfers to the regeneration step. Then, regeneration gas is introduced into the adsorption column P1 or P2 through the passage Lc to desorb moisture and the likes adsorbed on the adsorbent, whereby the adsorbing activity thereof is regenerated. Desorbed components are discharged together with the regeneration gas to the outside through the passage Le1 or Le2. In addition, the aforementioned use time varies depending on the cleanliness of feed air. In general, outdoor air of a factory is frequently extracted as feed air, and hence the use time of adsorbent is affected by season, climate or a locating situation for the air-extracting point. In order to lessen such influences, the dust removal or pre-cooling of extracted air may be performed by pre-treatment units or the condensing separation thereof will be previously carried out.

At that time, it is characterized, differently from conventional methods, that there is particularly no limit as the regeneration gas, if it has the regenerating capacity for an adsorbent and does not contaminate the adsorbent. Judging from the fact that an object of this plant is air, it is preferred that regeneration gas is clean (purified) air or nitrogen. In a case where this plant is used in a combination with ASU, in particular, it is possible to use purified gas from ASU that is surplus or rejected, whose oxygen and nitrogen purity is higher and hence it is preferable to use this gas. Although a condition for the regeneration gas varies depending on the use of purified air or the like, air at a flow rate of about 500~2,000 [Nm$^3$/h] will be used.

As one of the features of this plant, it can be pointed out to insert a purge step at a time when an adsorption column transfers from the regeneration step to the purification step. Namely, it is intended to relieve a transient phenomenon resulting from the adsorbing characteristics of a zeolite-series adsorbent, which has been caused at a time when an adsorption column transfers from the regeneration step to the purification step. In the purge step, concretely, purge gas is introduced into the adsorption column P1 or P2 from its column top through the passage Ld and this purge gas is discharged from the lower portion of the column through the passages Le1 & Lf1 or Le2 & Lf2. The purge gas has preferably the same condition as purified air fed out of an adsorption column in the purification step and namely, the purified air at a flow rate of about 500~2,000 [Nm$^3$/h] is supplied as the purge gas under a low temperature & high pressure condition. In addition, the supply pressure thereof is secured by a compressor (not shown) or the like similarly to the purification step and it is pressurized as high as 0.5~2 [MPaG]. In this construction example, there is described, as shown in FIG. 1, a construction where purified air used as the purge gas is supplied from the outside. However, it is possible to use, as the purge gas, part of the purified air fed out of the adsorption column in the purification step, as in the second construction example, which will be hereinafter described.

Depending on the TSA system, PSA system, or a combination of them, a setting condition or the likes for the purge step vary because of their mechanisms. Individual cases will be described below in detail.

(1) In the TSA System

In the TSA system, a regeneration step (including a regeneration, warming step under a high temperature condition and a regeneration cooling step under a low temperature condition) and a purification step under a low temperature condition are repeated in each of the adsorption columns. In a case where the nitrogen concentration in regeneration gas is lower than the nitrogen concentration in air, in particular, partial pressure of nitrogen rises at a time when the adsorption column transfers to the purification step and hence selective adsorption of nitrogen is caused. Accordingly, the oxygen concentration sometimes rises several percentages temporarily.

In order to relieve such transient phenomenon, in the present invention, a purge step using gas having the same composition as that of purified air is provided between both the steps and the pressure of an adsorption column is controlled in the purge step so as to be almost equal to that of the purification step.

(2) In PSA system

In the PSA system, a regeneration step under a low pressure condition and a purification step under a high pressure condition are switched at a given period of time in each of the adsorption columns. In a case where an adsorbent has transferred from a regeneration step, where the amount of adsorbed substances on the surface of the adsorbent under a low pressure is small, to a high pressure purification step of forming such a state that the partial pressure of the adsorbed substances is high, at that time, the nitrogen concentration in purified air fed out of the adsorption column drops temporarily owing to the height of the nitrogen-adsorbing capacity thereof similarly to the case of the TSA system. Since the partial pressure of nitrogen in regeneration gas is vastly lower than the partial pressure of nitrogen in the purification step, as compared with TSA, influences thereof sometimes becomes larger. As a measured value, the oxygen concentration sometimes gets 25~50%, as has been mentioned.

By providing between both the steps a purge step using gas having the same composition as that of purified air and by controlling the internal pressure Pp of an adsorption column in the purge step such that a differential pressure thereof from the internal set pressure Pr in the purification step falls within a specified value, at that time, such transient phenomenon can be relieved. By concretely controlling, in the pressure rise course, the same internal pressure Pp so that the equations Pr×1.05≧Pp≧Pr×0.95 are satisfied, the rise of oxygen concentration after the switching can be restrained below 0.5%

(3) In Combination System of TSA & PSA

In this plant, a system, in which the aforementioned TSA and PSA are combined, is often adopted. Also in this case, a transient phenomenon in each system is synergistically caused. However, such transient phenomenon can be relieved by providing between both the steps a purge step using gas having the same composition as that of purified air and by controlling the internal pressure Pp of an adsorption column in the purge step such that a differential pressure thereof from the internal set pressure Pr in the purification step falls within a specified value.

In this plant, it is possible to provide a step of subjecting, when the adsorption column in the purge step transfers to the purification step, feed air to adsorptive treatment in parallel to an adsorption column (P) in the purification step. Although an adsorbent charged in an adsorption column just before it transfers to the purification step gets very close to the state of an adsorbent charged in an adsorption column in the purification step, namely, it is required, for making the completely same conditions, to take a predetermined period of time. By parallel operating an adsorption column just before it transfers to the purification step and an adsorption column in the purification step under the same condition, accordingly, there can be eliminated any influences of a transient phenomenon at a time when an adsorption column transfers from the purge step to the purification step. Supply amounts of, in the parallel operation, CDA from the adsorption column in the transferring course and CDA from the adsorption column in the purification step are preferable set optionally. Details thereof will be descried below.

Producing Method Using Aforementioned Compressed Air Producing Plant

The compressed air producing method according to the present invention is characterized in that three steps of a purification step, regeneration step, and purge step are continuously switched in turn as one cycle and the adsorption columns are controlled such that when one of pairing adsorption columns P1, P2 is in the purification step, the other is in the regeneration step or purge step. Now referring to FIG. 2, there will be described below in detail an example of a case where the TSA and PSA combined systems is used; this is a case where the purification step of feed air under a high pressure & low temperature condition, the regeneration warming step using regeneration gas under a low pressure & high temperature condition, the regeneration cooling step using regeneration gas under a low pressure & low temperature condition, and the purge step using purge gas under a high pressure & low temperature condition are performed as one cycle.

(1) Purification of Feed Air by Adsorption Column P1

FIG. 2(1) shows a state where the adsorption column P1 is in the purification step and the adsorption column P2 is in the regeneration step. As shown by a solid line in FIG. 2(1), feed air is introduced into the adsorption column P1 from its lower portion through the passage La. Air introduced in the adsorption column P1 is subjected to purifying treatment by an adsorbent charged in the column inside. Purified air that has been thus treated is fed out as product CDA from the column top through the passage Lb. At that time, the control valves Va1 & Vb1 are controlled so as to be opened. In the adsorption column P1, higher adsorbing capacity can be utilized by controlling its internal temperature to a low temperature condition and its internal pressure to a high pressure condition. This purification step is usually set so that continuous treatment for decades minutes~decades times can be performed, although it varies depending on the property of feed air or the presence of its pretreatment.

(2) Regeneration of Adsorbent by Adsorption Column P2

As shown by a dashed line in FIG. 2(1), regeneration gas is introduced into the adsorption column P2 from its column top through the passage Lc. Introduction of regeneration gas in a flowing direction reverse to that of the purification step can enhance the regenerating effect. Regeneration gas introduced in the adsorption column P2 transfers substances such as moisture and carbon dioxide desorbed from the surface of the adsorbent charged in the column inside, thereby performing the regeneration treatment of the adsorbent. The regeneration gas that has been used for the regeneration treatment is discharged from the lower portion of the column through the passage Le2. At that time, the control valves Vc, Vc2 & Ve2 are controlled so as to be opened. In the adsorption column P2, higher regenerating function can be exercised by transferring its internal temperature from a low temperature state to a high temperature state in the warming step, transferring the same internal temperature from a high temperature state to a low temperature state in the cooling step, and controlling its internal pressure to a low pressure condition. The regeneration warming step is performed by turning on, for example, a heater placed at the regeneration gas inlet of an adsorption column to shift the supply temperature of regeneration gas to a high temperature condition. And, the regeneration cooling step is performed by turning off the heater to shift the supply temperature of regeneration gas to a low temperature condition.

This regeneration step is usually set so that continuous treatment for decades minutes~several times can be performed, although it varies depending on the property of feed air or the feature of an adsorbent. Although there is usually used a method of causing regeneration gas at a predetermined flow rate to continuously pass through an adsorption column, it is also possible, for reducing the use amount of regeneration gas, to cause regenerating gas to intermittently pass here.

(3) Purge of Adsorption Column P2

FIG. 2(2) shows a state where the adsorption column P1 is in the purification step and the adsorption column P2 is in the purge step. As shown by a dashed line in FIG. 2(2), purge gas is introduced into the adsorption column P2 from its column top through the passage Ld. Introduction of purge gas in a flowing direction reverse to that of the purification step can reduce effectively a transient phenomenon just after the adsorption column is switched to the purification step. Purge gas introduced in the adsorption column P2 purges regeneration gas existing in the inside thereof and replaces the oxygen and nitrogen adsorbed state on the surface of the adsorbent similarly to the surface state thereof in the purification step. The purge gas that has been used for the treatment is discharged out of the lower portion of the adsorption column P2 through the passages Le2 & Lf2. Since purge gas is equal to the purified air and it is required to use a small amount thereof effectively, in this construction example, the flow rate of purge gas is limited by providing passages Lf1 & Lf2 that are different from the discharge passage for the regeneration gas. At that time, the control valves Vd, Vc2 and Vf2 are controlled so as to be opened. When the adsorption column P2 transfers to the purification step, its smooth transfer to the purification step can be attempted by controlling the internal temperature to a low temperature condition and the internal pressure to a high pressure condition.

This purge step is usually set so that continuous treatment for several minutes~decades minutes can be performed, although it varies depending on the property of feed air or the feature of an adsorbent. Although there is usually used a method of causing purge gas at a predetermined flow rate to continuously pass through an adsorption column, it is also possible, for reducing the use amount of purge gas, to cause purge gas to intermittently pass here. By introducing a predetermined amount of purge gas once from a low pressure state in the inside of an adsorption column in the regeneration step to make a pressurized state, and then causing purge gas at a small flow rate to pass, it is possible to perform more efficient purge treatment.

(4) Parallel Operation of Adsorption Columns P1 & P2

FIG. 2(3) shows a case where a period of subjecting feed air to adsorptive treatment is provided in parallel to the adsorption column P1 in the purification step when the adsorption column P2 in the purge step transfers to the purification step. As shown by a solid line in FIG. 2(3), feed air is introduced into the adsorption columns P1 & P2 from their lower portions through the passage La. Purified air currents from the column tops of the adsorption columns P1 & P2, which have been treated there, are mixed and fed out as product CDA through the passage Lb. At that time, the control valves Va1 & Va2 and Vb1 & Vb2 are controlled so as to be opened. The adsorption columns P1 & P2 can utilize higher adsorbing capacity by controlling their internal temperature to a low temperature condition and their internal pressure to a high pressure condition. In the adsorption column P2, a current of air to be treated is made to flow reverse and CDA obtained by purifying feed air is fed out of the column top in succession to purge gas equal to the purified air in the purge step. At that time, mixed CDA is made to have stable properties in oxygen concentration and the likes, as it scarcely undergoes (doe not almost completely undergo) any influence of transient phenomenon at a time when the adsorption column P2 transfers from the purge step to the purification step.

It is possible to optionally set the feed amount C1 from the adsorption column P1 and the supply amount C2 from the adsorption column P2 during the parallel operation in accordance with (a) a method of making C1=C2 from the beginning at a time when the adsorption column is switched from the purge step; (b) a method of making C2<C1 in the beginning, transferring to C2>C1 stepwise and transferring to the next step; or (c) a method of conducing the transfer to C2>C1 continuously and gradually. It is preferred to make the ratio of the supply amount optionally changeable.

(5) Switching of the Steps in Adsorption Columns P1 & P2

FIG. 2(4) shows a state where the adsorption column P1 is in the regeneration step and the adsorption column P2 is in the purification step and FIG. 2(5) shows a state where the adsorption column P1 is in the purge step and the adsorption column P2 is in the purification step. In a compressed air producing process, namely, the adsorption columns P1 and P2 are switched after the process has transferred to the steps of FIG. 2(1)~(2) or FIG. 2(1)~(3), and then the same steps as the aforementioned (1)~(3) or (1)~(4) are performed. In a case where two adsorption columns are used as mentioned above, purified air can be continuously supplied by alternately controlling the pairing adsorption columns P1, P2 so that when one of them is in the purification step, the other column is in the regeneration step or purge step, the other column is in the regeneration step or purge step. In a case where three or more adsorption columns are used, furthermore, there can be adopted a method of combining an adsorption column (R) in the regeneration step or purge step with an adsorption column (P) in the purification step in turn as the pairing adsorption columns or a method of previously fixing pairing adsorption columns and forming a cycle between both the adsorption columns. In any method, purified air can be continuously supplied by the pairing adsorption columns.

(6) Pressure Change in Adsorption Columns

Pressure change in an adsorption column in the aforementioned process (1)~(5) is exemplified in FIG. 3. From the purification step p in the high pressure P(H) and low temperature T(L) state, the regeneration step is formed through a transferring course r1 to the low pressure P(L) and high temperature T(H) state, a regeneration treating state r2 for a predetermined period of time and a transferring course r3 from that state to the high pressure P(H) (exactly P(H')) and low temperature T(L) state, as regeneration gas is introduced. By forming the regeneration warming step in the first half of the transferring course r1 and regeneration treating state r2 and by forming the regeneration cooling step in the latter half of the regeneration treating state r2 and transferring course r3, at that time, the regeneration step can be completed.

Then, there is formed the purge step from a course r4 of maintaining the high pressure P(H') and low temperature T(L) sate to a transferring course r5 to the high pressure P(H) and low temperature T(L) sate, as purge gas in introduced. As shown in a broken line portion Q of FIG. 3, in addition, it is possible to increase the purging effect by releasing the regeneration gas in the adsorption column once after the stop of regeneration gas and before the introduction of purge gas.

FIG. 3 also shows pressure change in the steps, in a case where the parallel operation period p' is provided. The provision of the parallel operation period p' is based on the following reason. By maintaining the high pressure P(H) and low temperature T(L) state as in the pairing adsorption column (P) when the adsorption column is switched to the purification step and by performing the parallel operation of introducing feed air into both the adsorption columns for a predetermined period of time, namely, the compatibility with the features of purified air from the adsorption column (P) and the same purifying function can be secured and the purified air currents fed out of both the adsorption columns can have the same composition.

Through the purge step or the aforementioned parallel operation period p', thereafter, the purification step p is formed again as the high pressure P(H) and low temperature T(L) state is maintained.

Another Construction Example [Second Construction Example] of Compressed Air Producing Plant according to the Present Invention Another construction example of the compressed air producing plant according to the present invention is given in FIG. 4. Namely, this example is characterized in that part of the purified air fed out of the pairing adsorption column (P) is used as purge gas that is supplied from the outside through the passage Ld in the first construction example. As shown in FIG. 4, this example is concretely constructed such that a passage Lg is provided as a bypass in a passage of forming the passage Lb for supply of CDA or passage Lc for introduction of regeneration gas, provided on the column tops of the adsorption columns P1, P2, wherein part of the purified air fed out of the column top of one adsorption column (P) is introduced into the other adsorption column (R) through the control valve Vg. Thus, it is enabled to efficiently supply CDA that is stable in oxygen concentration, without preparing a separate facility for purge gas. Since gas required for purge is in a small amount, on the other hand, such a problem is not caused that the productivity of purified air is lowered due to the use of part of the purified air as purge gas. In addition, other constituent elements, control conditions or functions are similar to those of the first construction example.

Producing Method Using Compressed Air Producing Plant According to Second Construction Example Compressed air producing method according to the second construction example has features of the compressed air producing method according to the present invention because it has essentially the same construction as the first construction example. Moreover, the compressed air producing method according to the second construction example has such several different features as mentioned above because of differences in construction from the first construction example in following three steps. Now referring to FIG. 5, details thereof will be described below.

(1) Purification of Feed Air by Adsorption Column P1

As shown by a solid line in FIG. 5(1), this purification is similar to that of the producing method (1) exemplified in FIG. 2.

(2) Regeneration of Adsorbent by Adsorption Column P2

As shown by a dashed line in FIG. 5(1), regeneration gas is introduced into the adsorption column P2 from its column top through the passage Lc. Operations and functions at that time are similar to those of the producing method (2) exemplified in FIG. 2.

(3) Purge of Adsorption Column P2

As shown by a dashed line in FIG. 5(2), purge gas is introduced into the adsorption column P2 from its column top through the passage Lg. At that time, the control valve Vg is controlled so as to be opened. By virtue of simple construction, it is possible to have such features that the purging function can be secured and the higher identity of purified air can be secured. Other operations and functions are similar to those of the producing method (3) exemplified in FIG. 2.

(4) Parallel Operation of Adsorption Columns P1 & P2

As shown by a solid line in FIG. 5(3), such a point that it is possible to provide a period of subjecting feed air to adsorptive treatment in parallel to the adsorption column P1 in the purification step, when the adsorption column P2 in the purge step transfers to the purification step, it similar to the first construction example. Operations and functions, inclusive of the control valves at that time, are similar to those of the producing method (4) exemplified in FIG. 2.

(5) Switching of the Steps in Adsorption Columns P1 & P2

FIG. 5(4) shows a state where the adsorption column P1 is in the regeneration step and the adsorption column P2 is in the purification step. And, FIG. 5(5) shows a state where the adsorption column P1 is in the purge step and the adsorption column P2 is in the purification step. In the compressed air producing process, namely, the adsorption columns P1 and P2 are switched and the steps similar to the aforementioned (1)~(3) or (1)~(4) are performed after the process has transferred to the steps of FIG. 5(1)~(2) or FIG. 5(1)~(3). Other operations and functions are similar to those of the producing method (5) exemplified in FIG. 2. By controlling, in the purge of the adsorption column P1, the control valve Vg same as the aforementioned (3) so as to be opened, it is possible to have such features that the purging function can be secured and the higher identity of purified air can be secured.

(6) Pressure Change in Adsorption Columns

Pressure change in an adsorption column in the aforementioned processes (1)~(5) is of the content exemplified in FIG. 3, this is similar to the producing method (6) exemplified in FIG. 2. Other operations and functions are similar to those of the producing method (6) exemplified in FIG. 2.

EXECUTION EXAMPLE

Result of CDA production performed by use of the aforementioned compressed air producing process is given. Concretely, CDA production was executed in a nitrogen producing plant of the simultaneous CDA producing type having such a construction as exemplified in FIG. 4, which was installed in a semiconductor manufacturing factory.

Execution Condition
 (1) Content volume of Adsorption columns: 5 m$^3$;
 (2) Internal pressure and temperature in the purification step: 0.88 MPaG/17° C.;
 (3) Internal pressure in the regeneration step: 0.01 MPaG;
 (4) Flow rate of feed air: about 8,400 Nm$^3$/h;
 (5) Flow rate of regeneration gas: about 2,000 Nm$^3$/h;
 (6) Regeneration time: about 200 minutes;
 (7) Flow rate of purge gas: about 400 Nm$^3$/h; and
 (8) Purge time: 10 minutes.

Operating Method
 (1) Under the aforementioned execution condition, dry air was introduced into adsorption columns as feed air and these adsorption columns were operated in accordance with (the producing method using the compressed air producing plant according to the second construction example).
 (2) After the regeneration step, the control valve Vf1 or Vf2 on the bottom of the adsorption column P1 or P2 was made opened and purge was continued for 10 minutes, with keeping a pressure near to the internal pressure (1.0 MPaG) in the purification step. Then, the control valve Vf1 or Vf2 was made fully closed, whereby a differential pressure from the internal pressure (1.0 MPaG) in the purification step was made to be a pressure within a specified value, after the pressure rise step was passed again. Thereafter, the switching operation to the purification step was advanced. "A pressure near to the internal pressure in the purification step" used here represents a state P(H') in FIG. 3. According to the experimental results, it is preferred that the relation, for example P(H)×1.05>P(H')>P(H)×0.95, is satisfied.
 (3) Dry air from the top of the adsorption column P1 or P2, that had been treated, was concretely introduced as purge gas to perform the pressure rise step. At a time when the pressure P(H') of the inside thereof had been raised to about 98% of the internal pressure P(H) of the adsorption column in the purification step, the control valve Vf1 or Vf2 was made opened from the column bottom, whereby purge was performed for about 10 minutes, with keeping the pressure (this is corresponding to the step r4 in FIG. 3).

Results

The oxygen concentration of purified air fed out of the adsorption column P1 or P2 after it had been switched to the purification step was measured, and as a result, the rise of the oxygen concentration could be restrained to about 0.2%.

Industrial Availability

Although there have been described above the actions and functions of the CDA producing method and producing plant according to the present invention alone, they will be frequently used, in a real plant, as part of the aforementioned ASU. In such a case, it is possible to use the pressure raising means (compressor), pressure regulation means or flow regulation means provided in this plant together with ASU, and hence the energy efficiency can be improved.

Although there has been described in detail, in the aforementioned description, a case where the present invention is used in the CDA process on the basis of its preferable execution examples, it is possible to variously apply the present invention within a range of claims thereof and their fundamental concept. In a case where an adsorbent is used as a removal means for impurities in a sample comprising a plurality of main components such as natural gas, for instance, a transient state different in the component ratio, accompanied with a pressure difference, as in TSA system or PSA system, may be formed owing to the differences in the adsorbing and desorbing capacities onto and from the adsorbent among main components such as methane, ethane or propane. By utilizing a method and plant having the construction and functions according to the present invention even in a process where such variation in composition cannot be ignored, it is enabled to supply a purified product that is high in stability and reliability.

DESCRIPTION OF REFERENCE SIGNS

Figure 1:
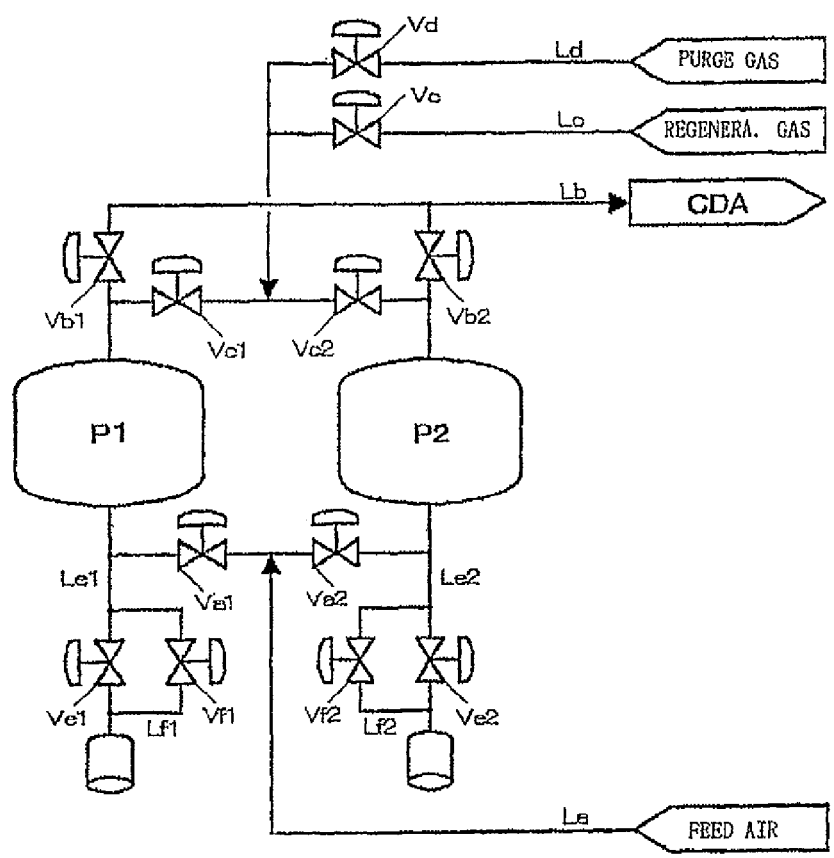
FIG. 1 is an explanatory view showing the basic construction example of the compressed air producing plant according to the present invention.
Figure 2:
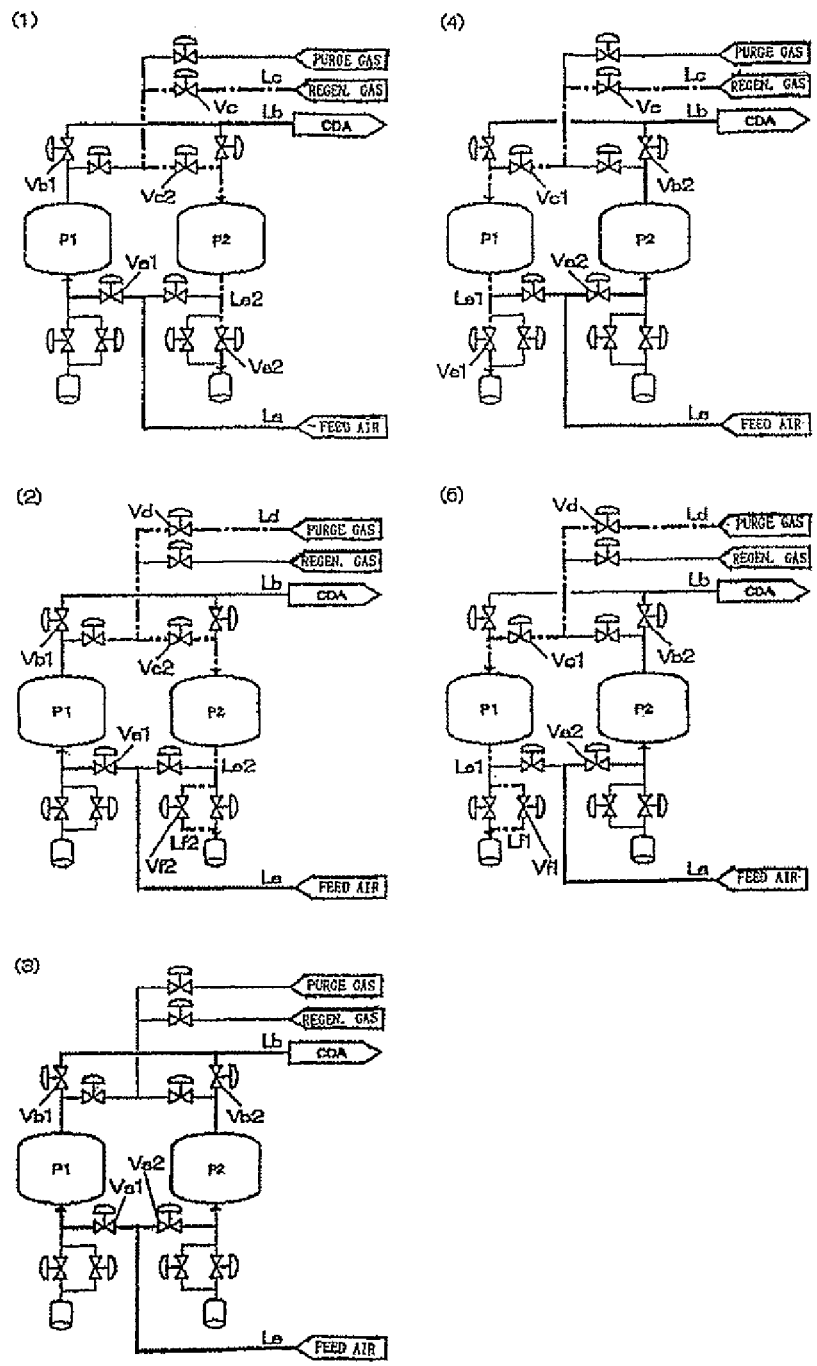
FIG. 2 is an explanatory view exemplifying the producing step, in which the aforementioned compressed air producing plant is used.
Figure 3:
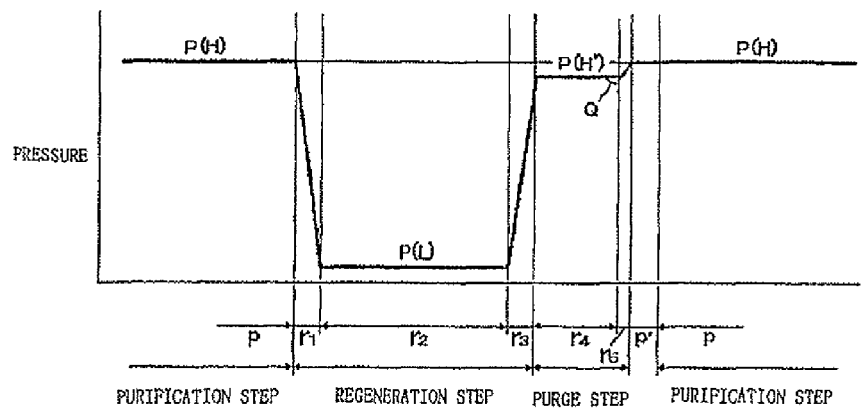
FIG. 3 is an explanatory view exemplifying changes in the internal temperature and pressure of the adsorption column in the aforementioned producing step.
Figure 4:
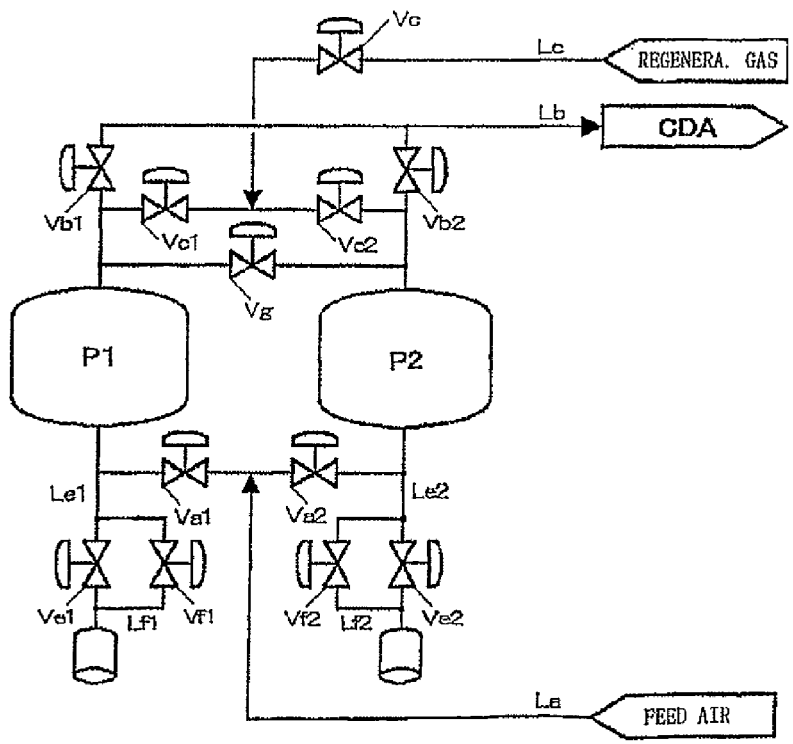
FIG. 4 is an explanatory view showing another construction example of the compressed air producing plant according to the present invention.
Figure 5:
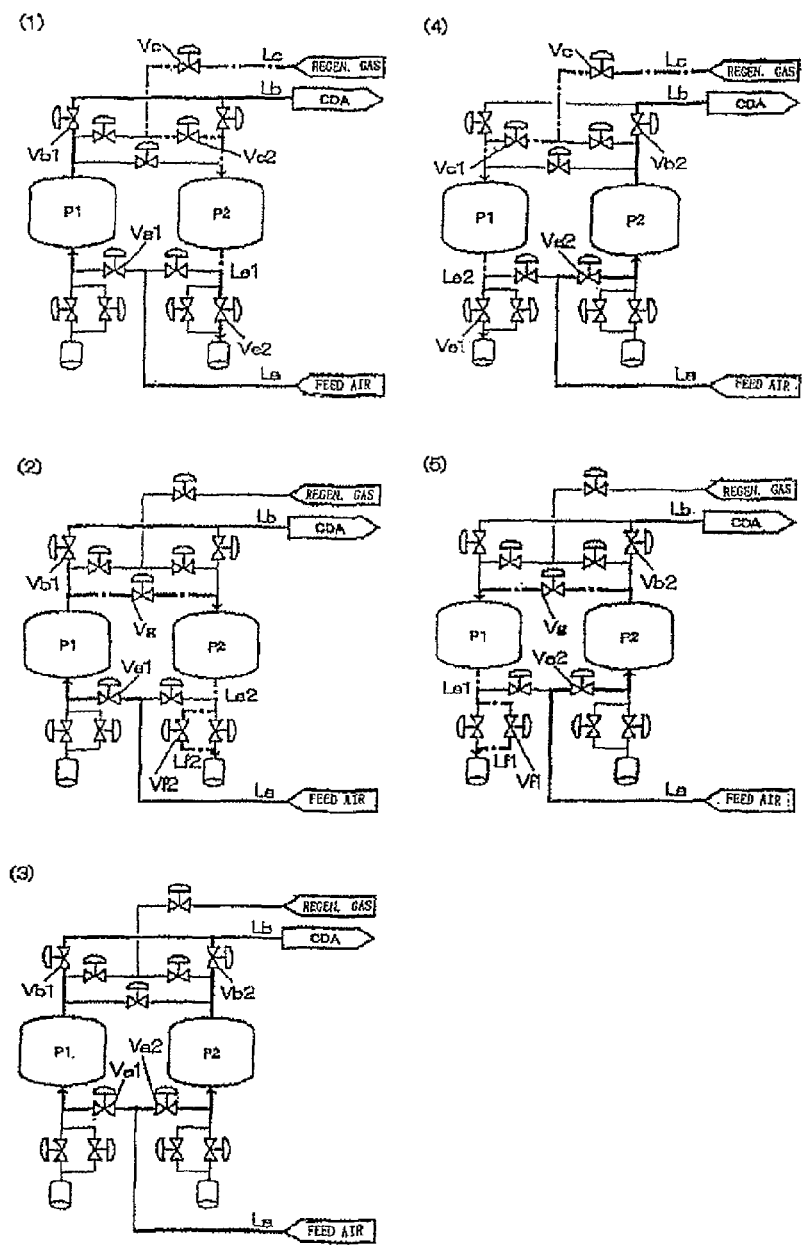
FIG. 5 is an explanatory view exemplifying the producing step, in which the aforementioned compressed air producing plant is used.
Figure 6:
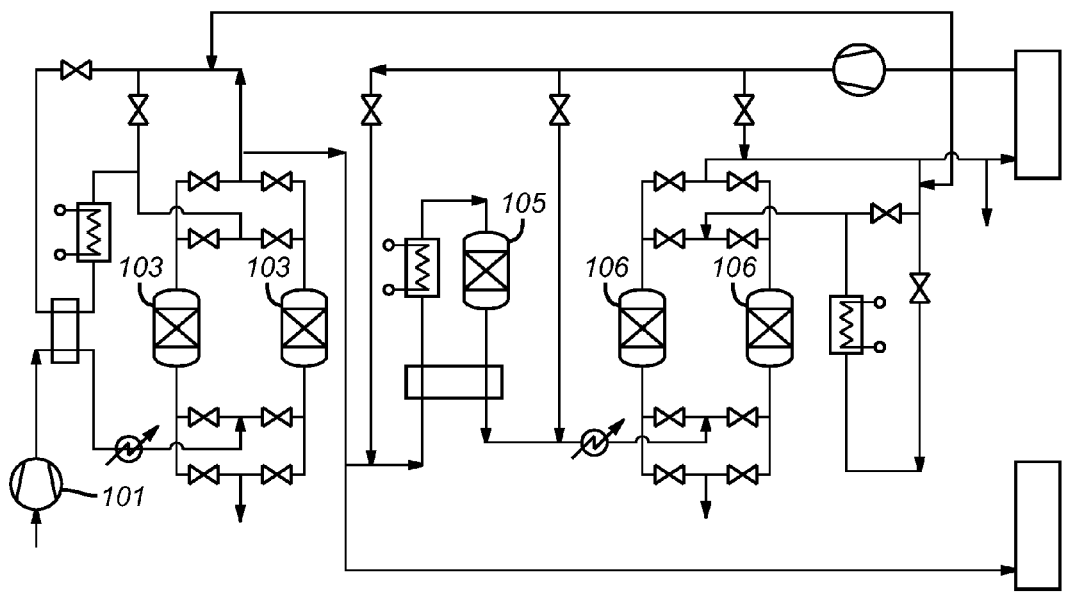
FIG. 6 is an explanatory view exemplifying the construction of the dry air producing plant according to the prior arts.
Figure 7:
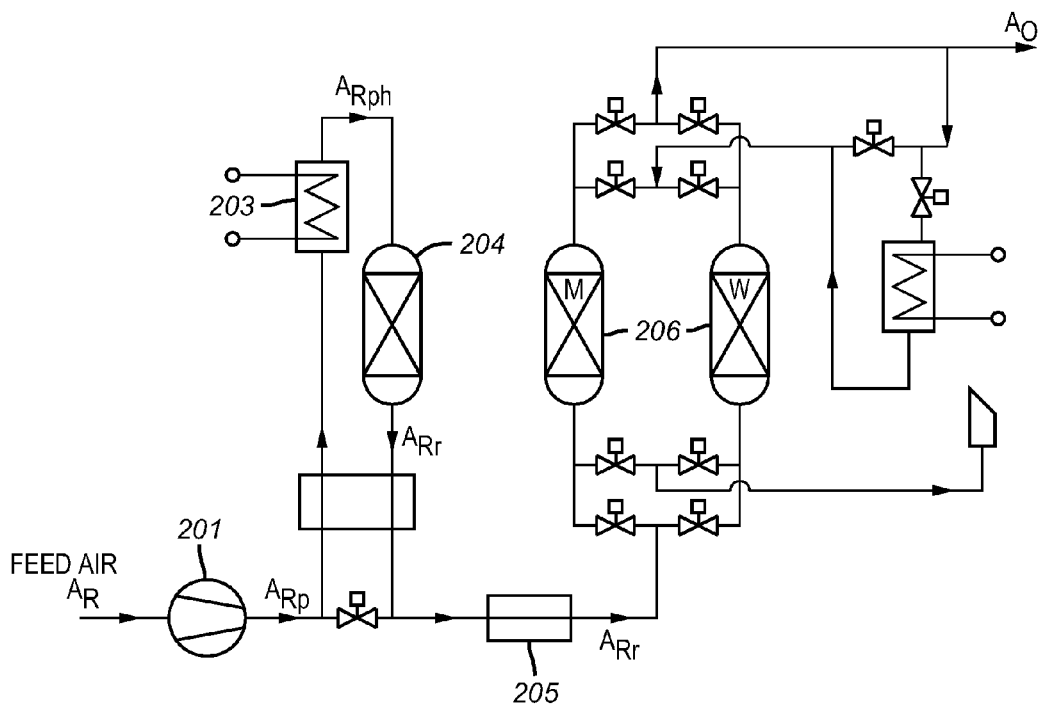
FIG. 7 is an explanatory view exemplifying the construction of the CDA producing plant according to the prior arts.
Figure 8:
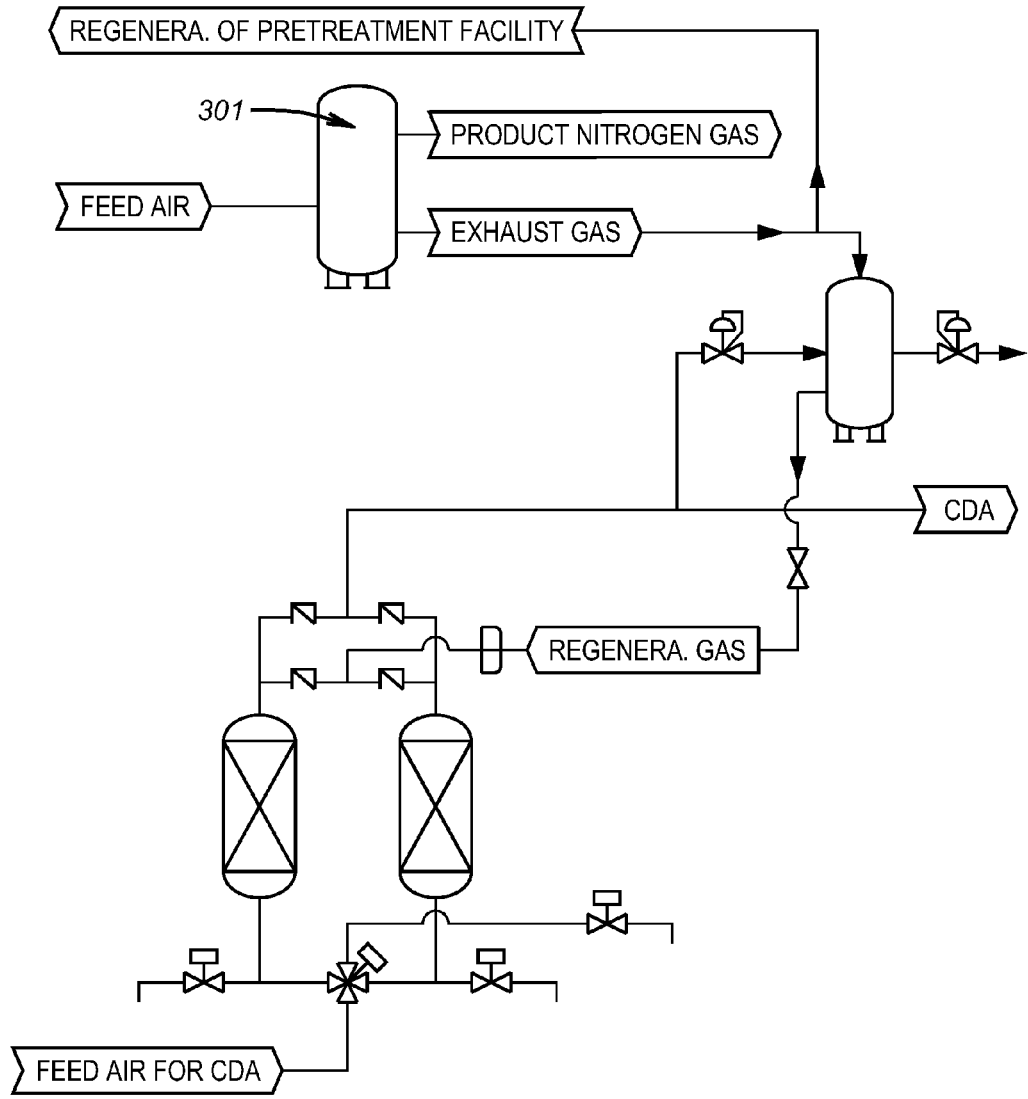
FIG. 8 is an explanatory view exemplifying the construction of the CDA producing plant according to the prior arts.

P1, P2—adsorption columns, La, Lb, Lc, Ld, Le1, Le2, Lf1, Lf2—passages, Va1, Va2, Vb1, Vb2, Vc, Vc1, Vc2, Vd, Ve1, Ve2, Vf1, Vf2, Vg—control valves, Tp—Internal temperature of the adsorption column, Tr—Internal set temperature in the purification step, Pp—Internal pressure of the adsorption column, Pr—Internal set pressure in the purification step.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A compressed air producing method, in which two or more adsorption columns, in all or part of which a zeolite-series adsorbent is charged, are switched to purify feed air and the adsorbent charged in at least one adsorption column of said adsorption columns is regenerated in turn with regeneration gas, characterized by comprising a step of performing, when an adsorption column (R) in a regeneration step transfers to a purification step, the purge of said adsorbent with purified air, and characterized in that the internal pressure of an adsorption column (R) in the regeneration step and together in the purge step is controlled such that a differential pressure thereof from the internal pressure of an adsorption column (P) in the purification step falls within a specified value, in which said adsorption columns are continuously switched in turn at least to (1) a feed air purification step under a high pressure & low temperature condition; (2) a regeneration warming step using regeneration gas under a low pressure & high temperature condition; (3) a regeneration cooling step using regeneration gas under a low pressure & low temperature condition; and (4) a purge step using purge gas under a high pressure & low temperature condition as one cycle, and said adsorption columns are controlled such that when one adsorption column of said adsorption columns is in the regeneration step or purge step, at least another one column is in the purification step.

2. The compressed air producing method of claim 1, in which part of purified air fed out of at least one adsorption column (P) in said purification step is used as purge gas.

3. The compressed air producing method of claim 1, which comprises a step of subjecting, when the adsorption column in said purge step transfers to the purification step, feed air to adsorbing treatment in parallel to at least another one adsorption column (P) in the purification step.

* * * * *